(12) United States Patent
Genta et al.

(10) Patent No.: US 11,715,905 B2
(45) Date of Patent: Aug. 1, 2023

(54) ANGLED HOUSING PART AND ANGLED HOUSING ASSEMBLY

(71) Applicant: TE Connectivity Italia Distribution S.r.l., Turin (IT)

(72) Inventors: Alessandro Genta, Turin (IT); Raoul Zannini, Turin (IT); Claudia Cezza, Turin (IT)

(73) Assignee: TE Connectivity Italia Distribution S.r.l., Turin (IT)

( * ) Notice: Subject to any disclaimer, the term of this patent is extended or adjusted under 35 U.S.C. 154(b) by 53 days.

(21) Appl. No.: 17/383,959

(22) Filed: Jul. 23, 2021

(65) Prior Publication Data
US 2022/0029347 A1    Jan. 27, 2022

(30) Foreign Application Priority Data
Jul. 24, 2020    (IT) .................. 102020000017959

(51) Int. Cl.
*H01R 13/40*   (2006.01)
*H01R 13/52*   (2006.01)
*H01R 13/502*  (2006.01)

(52) U.S. Cl.
CPC ..... *H01R 13/5202* (2013.01); *H01R 13/5025* (2013.01)

(58) Field of Classification Search
CPC ................. H01R 13/5202; H01R 13/5025
USPC ................................................. 439/625
See application file for complete search history.

(56) References Cited

U.S. PATENT DOCUMENTS

| | | | |
|---|---|---|---|
| 5,716,235 A | 2/1998 | Endo et al. | |
| 8,651,899 B2 * | 2/2014 | Sartori .................. | F21S 41/162 |
| | | | 439/336 |
| 9,166,329 B2 * | 10/2015 | Eckel ................... | H01R 13/533 |
| 9,431,756 B2 | 8/2016 | Kataoka et al. | |
| 9,660,374 B2 * | 5/2017 | Baudelocque ......... | H05K 5/069 |
| 9,979,146 B2 * | 5/2018 | Vishwanath ........... | H01R 13/46 |
| 10,505,317 B2 * | 12/2019 | Maturo ................. | H03H 7/40 |
| 10,847,927 B2 * | 11/2020 | Maddens ........... | H01R 13/5219 |
| 11,171,440 B2 * | 11/2021 | Durse ................. | H01R 13/516 |
| 11,211,740 B2 * | 12/2021 | Arnoldi .................. | F04D 17/16 |

(Continued)

FOREIGN PATENT DOCUMENTS

| | | |
|---|---|---|
| JP | H595265 U | 4/1993 |
| JP | H9245921 A | 9/1997 |

(Continued)

OTHER PUBLICATIONS

Indian Search Report, Application No. 202144032526, dated Jun. 27, 2022, 6 pages.

(Continued)

*Primary Examiner* — Abdullah A Riyami
*Assistant Examiner* — Vladimir Imas
(74) *Attorney, Agent, or Firm* — Barley Snyder (57) ABSTRACT

An angled housing part for an electrical connector includes a first section having a first flange surface, a second section having a second flange surface, and a bellows section arranged between the first section and the second section. The first flange surface is angled with respect to the second section. The first section and the second section are movable relative to one another upon elastic deformation of the bellows section.

20 Claims, 4 Drawing Sheets

(56) References Cited

U.S. PATENT DOCUMENTS

| | | | |
|---|---|---|---|
| 2008/0026639 A1* | 1/2008 | Sardi | B60L 53/16 |
| | | | 439/607.41 |
| 2014/0030902 A1 | 1/2014 | Baudelocque et al. | |
| 2020/0176937 A1* | 6/2020 | Azad | H01R 13/748 |
| 2020/0328554 A1* | 10/2020 | Asano | H01R 13/5202 |
| 2020/0412040 A1* | 12/2020 | Yang | H01R 13/6273 |
| 2022/0085545 A1* | 3/2022 | Nickel | H01R 13/5202 |

FOREIGN PATENT DOCUMENTS

| | | | |
|---|---|---|---|
| JP | 2007127206 A | 5/2007 | |
| JP | 201841680 A | 3/2018 | |

OTHER PUBLICATIONS

Japanese Office Action with English Translation, Application No. 2021-118675, dated Jul. 19, 2022, 6 pages.
Italian Search Report, dated Mar. 12, 2021, 8 pages.

* cited by examiner

ANGLED HOUSING PART AND ANGLED HOUSING ASSEMBLY

CROSS-REFERENCE TO RELATED APPLICATIONS

This application claims the benefit of the filing date under 35 U.S.C. § 119(a)-(d) of Italian Patent Application No. 102020000017959, filed on Jul. 24, 2020.

FIELD OF THE INVENTION

The present invention relates to a housing part for an electrical connector and, more particularly, to an angled housing part.

BACKGROUND

In the art, angled housing parts for electrical connectors are known. For some applications, e.g. charge inlets for electric vehicles, there is the need to manage wire inserts or exits which are arranged at an angle to one another. Different wire inserts or exits may for instance be applied for direct current or alternating current. Additionally, electrical connectors need to be sealed against environmental influences, for instance against water ingress.

The assembly of such an electric connector requires several elements, may be cumbersome, and may risk damaging elements, such as seals, during assembly. Existing solutions comprising a multitude of elements are furthermore not well suited for automation or require a time-consuming and expensive assembly procedure.

SUMMARY

An angled housing part for an electrical connector includes a first section having a first flange surface, a second section having a second flange surface, and a bellows section arranged between the first section and the second section. The first flange surface is angled with respect to the second section. The first section and the second section are movable relative to one another upon elastic deformation of the bellows section.

BRIEF DESCRIPTION OF THE DRAWINGS

The invention will now be described by way of example with reference to the accompanying Figures, of which.

DETAILED DESCRIPTION OF THE EMBODIMENT(S)

The present invention will be described by way of exemplary embodiments shown in the accompanying figures. Technical features having the same or similar function and/or the same or similar structure will be denoted with the same reference numeral. Unless explicitly stated otherwise, the explanation of technical features given in one figure may be transferred to the example shown in another figure. The technical features of the embodiments shown in the figures may be arbitrarily combined with each other or may be omitted. The embodiments shown are intended for explanation and do not limit the scope of the present invention, which is defined by the claims.

Figure 1:
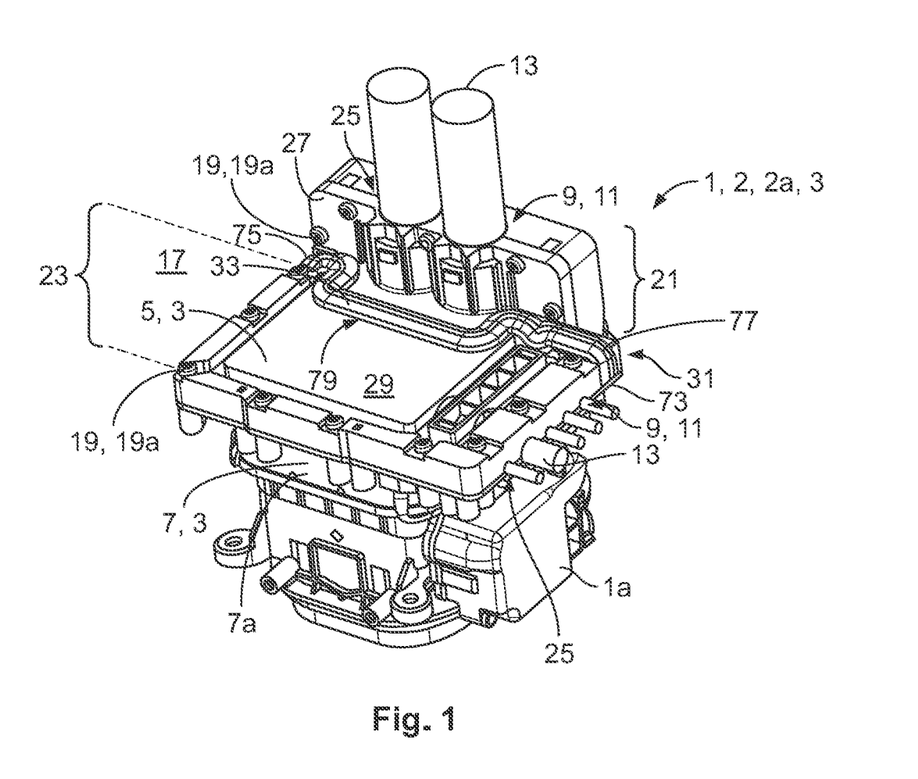
FIG. 1 is a perspective view of an angled housing assembly according to an embodiment.

An angled housing assembly 1 according to an embodiment is shown in FIG. 1 in an assembly state 3, in which an angled housing part 5 and a complementary angled housing part 7 are joined to one another. Both the angled housing part 5 and the complementary angled housing part 7 are in the assembly state 3 in FIG. 1.

As shown in FIG. 1, the complementary angled housing part 7 is attached to a connecting structure 1a. The connecting structure 1a may be a part of an electrical connector 2, which, in the embodiment shown, is an angled electrical connector 2a. In an embodiment, the angled housing part 5 may be a cover and the angled housing assembly 1 may be an electric connector receiving a multitude of cables or wires.

The angled electrical connector 2a, as shown in FIG. 1, has a vertical flange portion 21 and a horizontal flange portion 23. It is noted that the labeling vertical and horizontal does not limit those portions, as the actual orientation may change if the entire 90° angled electrical connector 2a is rotated.

The angled housing part 5 and the complementary angled housing part 7 each have a cable insertion portion 25, which are essentially oriented perpendicular to each other as shown in FIG. 1. It is also conceivable that three or four or more of such cable insertion portions 25 may be provided that allow insertion of at least one cable 13 from different directions. The complementary angled housing part 7 has a housing shell 7a and a flange section 7b, shown in FIG. 5.

In the assembly state 3 shown in FIG. 1, cable channels 9 of the angled housing part 5 and the complementary angled housing part 7 form cable openings 11. When cables 13 are received in the corresponding cable openings 11 formed by the corresponding cable channels 9, an interior 15 (see FIG. 6) is sealed against an outside 17. In FIG. 1, only two cable channels 9 and cable openings 11 are shown. Further, only two cables 13 are provided with reference numerals for the sake of visibility. The angled housing part 5 and the complementary angled housing part 7 are held at each other, in particular are pressed against each other by fixation devices 19, e.g. screws 19a. Again, for the sake of simplicity and visibility, only one fixation device 19, embodied as a screw 19a is provided with a reference numeral. Further possible fixation devices 19 are rivets, bolts or a combination thereof.

The angled housing part 5 has a first section 27 and a second section 29, which, in the embodiment shown in FIG. 1, are oriented perpendicularly to one another. As a general note, the first section 27 and the second section 29 are interchangeable and mainly distinguished for explanation.

As shown in FIG. 1, the first 27 and the second section 29 are connected to one another by a deformable bellows section 31, which is arranged between the first section 27 and the second section 29. The bellows section 31 comprises an elastic material 33 that allows for the first section 27 and the second section 29 to be moved relative to one another upon elastic deformation of the bellows section 31, i.e. upon elastic deformation of the elastic material 33. The bellows section 31 has a non-linear shape. The bellows section 31 may be compressed and/or stretched, wherein the rigidity of the bellows section material 33, i.e. the rigidity of the elastic material 33, may be a lower than a rigidity of the first 27 and the second section 29.

The deformable bellows section 31 may be understood as a movement joint, i.e. an assembly for holding two elements together, while allowing a relative movement between both elements. The bellows section 31 may comprise one or more convolutions or curved sections of the bellows material 33, wherein the at least one convolution or curved section does not need to be closed in itself, i.e. does not need to form a closed loop. In an embodiment, the convolution may be present only if the bellows section 31 is compressed.

The elastic material 33 may be compressible and/or stretchable, in particular in a repetitive manner. The deformation may be reversible in an embodiment. The bellows section 31 may therefore comprise a material of high resilience, i.e. the ability to be elastically deformed and to revert back to and un-deformed state. The elastic material 33 provided by the bellows section 31 may connect the first section 27 and the second section 29 to one to another.

As shown in FIG. 1, both the first section 27 and the second section 29 are attached to the complementary angled housing part 7 by fixation device 19.

Figure 2:
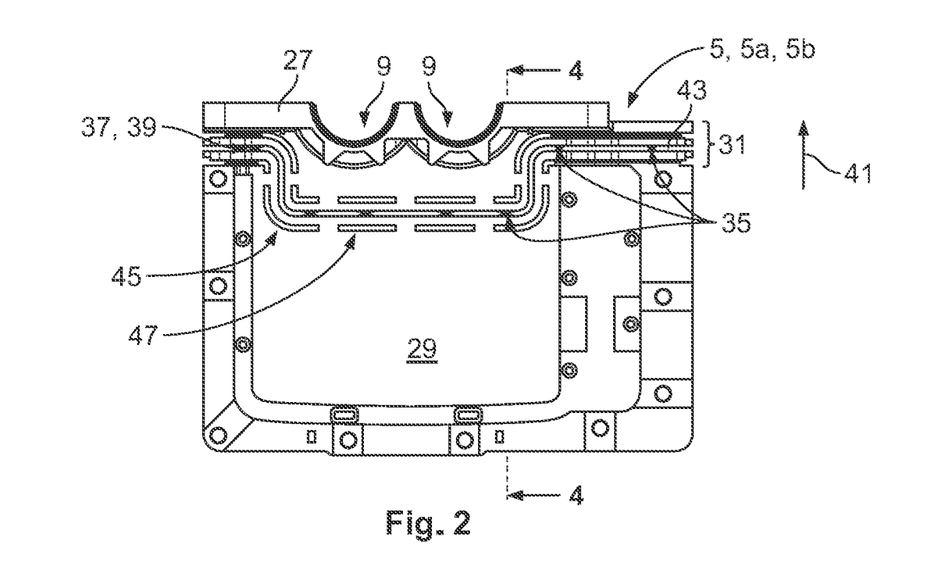
FIG. 2 is a top view of a preform of an angled housing part of the angled housing assembly.
Figure 3:
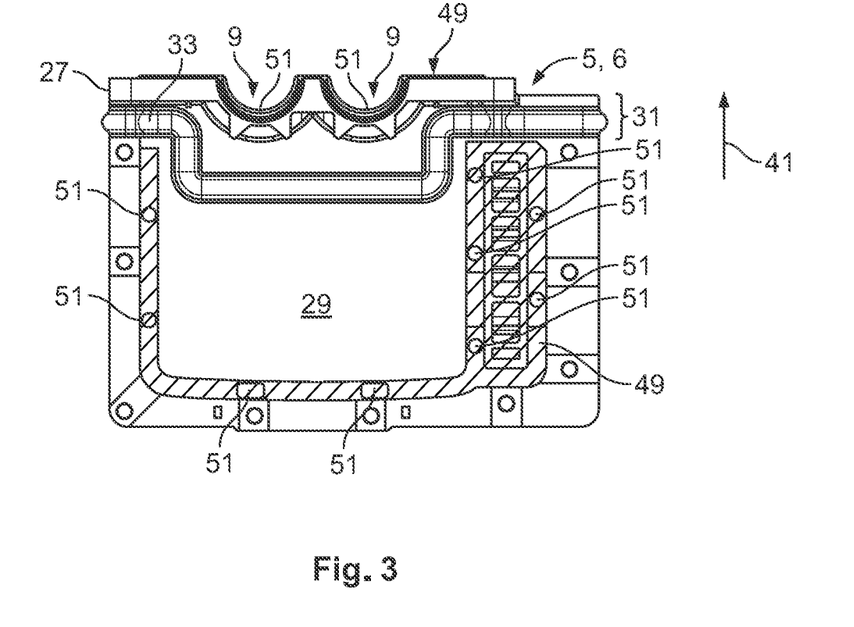
FIG. 3 is a top view of the angled housing part of FIG. 2 in an initial state.
Figure 4:
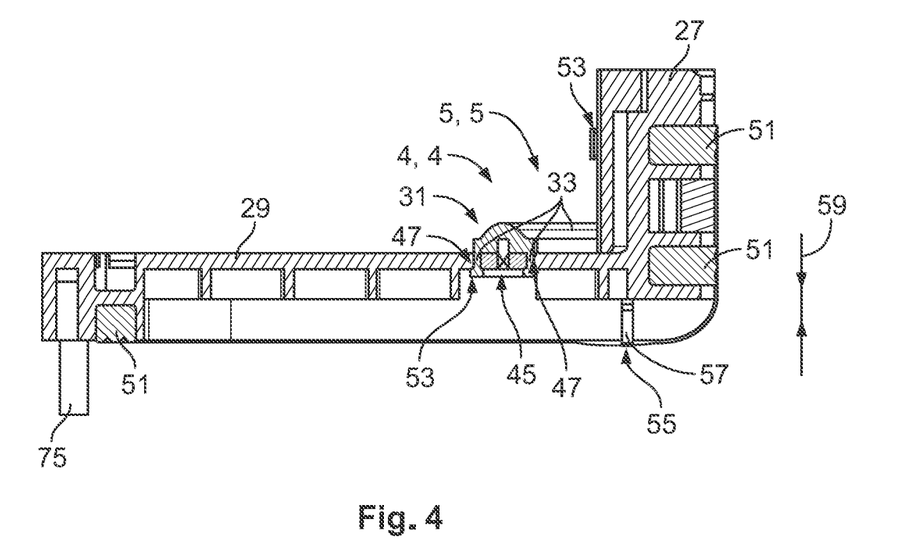
FIG. 4 is a sectional side view of the angled housing part of FIG. 3.

The following explanation refers to the angled housing part 5 shown in FIG. 2, FIG. 3 and FIG. 4.

In FIG. 2, a preform 5a of the inventive angled housing part 5 is shown in a top view. The first section 27 extends out of the drawing plane, whereas the second section 29 is oriented under an angle of 90 degrees thereto. The cable channels 9 of the first section 27 are clearly visible.

As shown in FIG. 2, between the first section 27 and the second section 29, at least one material bridge 35 across the bellows section 31 is provided, which rigidly connects the first 27 and the second section 29. The embodiment shown comprises seven material bridges 35, which are embodied as opposing pyramids 37, each of which has a predetermined breaking zone 39. In an embodiment, the rigidity of the elastic material 33 is lower than the rigidity of the material bridge 35.

The predetermined breaking zones 39 extend essentially perpendicular to a first direction 41 directed from the second section 29 to the first section 27. The material bridges 35 that comprise the predetermined breaking zones 39 extend along a gap 43 formed in the bellows section 31. The first direction 41 may be referred to as first mounting direction. The at least one predetermined breaking zone 39 may be referred to as a predetermined breaking point and may be a region of decreased stability, formed either mechanically (e.g. by a reduced thickness of the material) or chemically (a different material) or may be generated by a thermal or chemical treatment of said area. The at least one predetermined breaking zone 39 may be adapted to allow a separation of the first section 27 from the second section 29 if both sections 27, 29 are moved relative to one another.

The material bridge 35 may have a shape of a cone or a pyramid extending from the first section 27 towards the second section 29 or from the second section 29 towards the first section 27, respectively. The material bridge 35 may taper towards the predetermined breaking zone 39, wherein from each of the sections a cone or pyramid extends, such that two cones or pyramids are monolithically connected with one another in the predetermined breaking zone 39. In an embodiment, a multitude of predetermined breaking zones 39, i.e. a multitude of material bridges 35 are provided to initially stabilize the position of the first section 27 relative to the second section 29 in the initial state 6.

By the material bridges 35, the angled housing part 5 forms a monolithic structure 5b, wherein a position of the first section 27 with respect to the second section 29 is clearly determined and fixed. Further, the bellows section 31 has a perforation 45 shown in FIG. 2 comprising perforation openings 47, which will be explained in more detail with reference to FIG. 4.

In an embodiment, the first section 27, the second section 29, and the bellows section 31 may form an integral multi-component molded part. Such an integral multi-component molded part is an individual element and does not require to provide a plurality of elements for assembly of an electric connector. Such an integral molded part may further be fabricated by two molding steps, e.g. by molding the material 33 of the bellows section 31 over the material of the first section 27 and the second section 29. In particular, the material 33 of the bellows section 31 may be molded into the perforation 45 of the material bridge 35, thereby producing a form fit between the first 27 and the second section 29 and the bellows section 31. Holding structures may thus be molded. Those structures may extend through the perforation 45 and form anchor structures for sealing the perforation 45 and for fixing the bellows 31 to the first section 27 and the second section 29. The anchor structures may be embodied in the form of a T or L or similar structure.

FIG. 3 shows the inventive angled housing part 5 in an initial state 6. In FIG. 3 (as compared to the preform 5a of FIG. 2), the bellows section 31 further comprises the elastic material 33. Additionally, the angled housing part 5 has a sealing gasket 51 that extends along a flange surface 49 of the second section 29 as well as along a flange surface 49 of the first section 27. The flange surface 49 of the first section 27 may be referred to as the first flange surface and the flange surface 49 of the second section 29 may be referred to as the second flange surface. The bellows section 31 may form the sealing gasket 51 between the first section 27 and the second section 29. The bellow section 31 may be directly mounted to the sealing gasket 51 of each the first 27 and the second section 29 to ensure a continuous sealing. For example, the sealing gasket 51 of each of the first 27 and the second section 29 may comprise an interruption at an area in which the bellows section 31 may be inserted. In this area, the bellows section 31 forms the sealing gasket 51 between the first section 27 and the second section 29, such that sealing between the angled housing part 5 and the complementary angled housing part 7 may be continuously ensured.

The flange surfaces 49 of the first section 27 and the second section 29 may extend at least partially around a periphery of the corresponding section. The flange surfaces 49 may extend from a first position at the bellows section 31 towards a second position of the bellows section 31. A simple shape of such a flange surface 49 may be the U-shape. The sealing gasket 51 of the first 27 or second section 29 may be provided in or at the flange surface 49 and may thus comprise a shape similar to the shape of the flange surface 49.

The flange surface 49 is a surface suitable for connecting the angled housing part 5 to the corresponding complementary angled housing part 7, thereby forming the angled housing assembly 1. The flange surface 49 may be comprised or may be provided adjacent to a mounting surface of the corresponding section 27, 29. The mounting surface may be adapted to be connected to a corresponding complementary mounting surface of the complementary angled housing part 7. The flange surface 49 of the first section 27 faces in the first mounting direction 41. The bellows section 31 or the elastic material 33 thereof may extend from a backward facing part of the angled housing part 5, the backward facing part facing away from at least one of the flange 49 of the first section 27 and the second section 29. The flange surface 39 can abut against the complementary angled housing part 7.

In an embodiment, the first section 27 and the second section 29 are rigidly connected to one another in the initial state 6. The first section 27 and the second section 29 are fixed in a predetermined position relative to each other. In an embodiment, the bellows section 31 connects the first section 27 and the second section 29 in a relative position close to the relative position to each other in the initial state 6. It is therefore advantageous if an angular tilt of the first section 27 relative to the second section 29 may be minimized.

The angled housing part 5, in particular the first section 27 and the second section 29 may in the form a monolithical structure providing the predetermined position of the first section 27 and the second section 29 relative to one another. The initial state 6 may correspond to a state as-fabricated or a pre-assembly state, which is particularly advantageous for automation. This monolithic connection may extend across the bellows section 31. The first section 27 and the second section 29 may in particular be rigidly connected to one another by the at least one material bridge 35 across the bellows section 31, the material bridge 35 comprising the at least one predetermined breaking zone 39.

In an embodiment, the first 27 and the second section 29 of the angled housing part 5 may comprise a basically flat shape. A plane may be defined, wherein parallel to said plane the corresponding first 27 or second section 29 may be oriented. The flange surface 49 of a section 27, 29 may be oriented essentially parallel to said plane of the section 27, 29 or may be oriented at an angle thereto. In one embodiment, the first section 27 and the second section 29 may be oriented parallel to the same plane, whereas only the flange surface 49 of the first section 27 may be oriented at an angle to said plane and consequently to both, the first section 27 and the second section 29.

In both sections 27, 29, the sealing gasket 51 also extends along the cable channels 9. In the second section 29, the sealing gasket 51 is visible via through-holes. The flange surface 49 of the second section 29 is essentially U-shaped and indicated by a shading, as it faces into the drawing plane and is not visible in the top view of FIG. 3. The flange surface 49 of the first section 27 is angled with respect to the second section 29.

In FIG. 4, the embodiment of the inventive angled housing part 5 of FIG. 3 is shown in the initial state 6 in a cut side view along A-A (see FIG. 1). As shown in FIG. 4, the perforation 45, in particular the perforation openings 47, are filled by the elastic material 33 of the bellows section 31, thereby sealingly closing the gap 43. In the assembly state 3, the first section 27 and the second section 29 are separated by the gap 43, wherein the gap 43 is sealingly closed by the bellows section 31. Additionally, anchor structures 53 are formed for fixing the bellows section 31 to the first section 27 and to the second section 29 through perforation openings 47. In an embodiment, the anchor structures 53 may provide a corresponding form fit between the first 27 and the second section 29 and the bellows section 31. The anchor structures 53 may be molded and extend through the perforation 45, in particular the perforation openings 47. The anchor structures 53 may also be provided at the first section 27 by the sealing gasket 51 and may be adapted for sealing the perforation 45 and for fixing the bellows structure 31 to the first section 27 and the second section 29, respectively. The anchor structures 53 shown are embodied in the form of a T but may comprise different shapes, e.g. the form of an L or a similar structure.

The bellows section 31 may be joined to the material of the first section 27 by the corresponding perforation 45. The bellows section 31 may extend basically in a direction from the first 27 to the second section 29 and may continue in the second section 29, where it is joined to the material of the second section 29 by the perforation 45. Thereby, the bellows section 31 may cover an intermediate section, in particular the gap 43 between the first section 27 and the second section 29. The bellows section 31 can seal the intermediate section as well as any gap 43 between the first section 27 and the second section 29. The perforation 45 may extend parallel to the gap 43.

Figure 8:
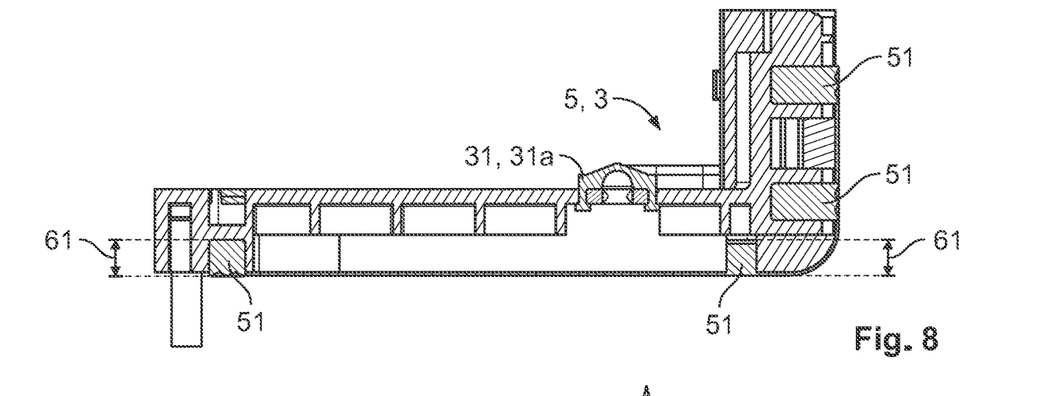
FIG. 8 is a sectional side view of the angled housing part in the assembly state.

In FIG. 4, a precompensation region 55 of the sealing gasket 51 is shown. In this precompensation region 55, excess sealing gasket material 57 is provided to compensate a lateral contraction 59 of the sealing gasket 51 in the assembly state 3. In comparison to the cut side view shown in FIG. 8, the effect of the precompensation region 55 is clearly visible, namely to provide an equal thickness 61 of the sealing gasket 51 in the assembly state 3 (see FIG. 8). The angled housing part 5 has at least one guiding member 75, and in an embodiment two guiding members 75. The at least one guiding member 75 may be embodied as a pin, a rail, a fin or a similar mechanical sliding structure.

Figure 5:
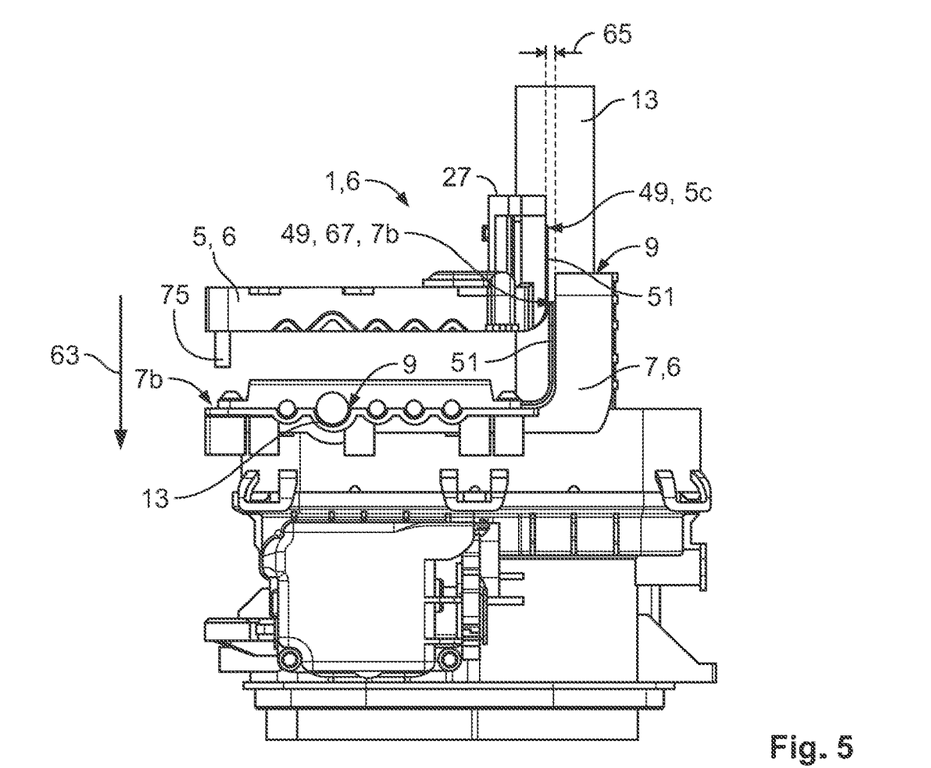
FIG. 5 is a top view of the angled housing assembly of FIG. 1 in an unassembled state.
Figure 6:
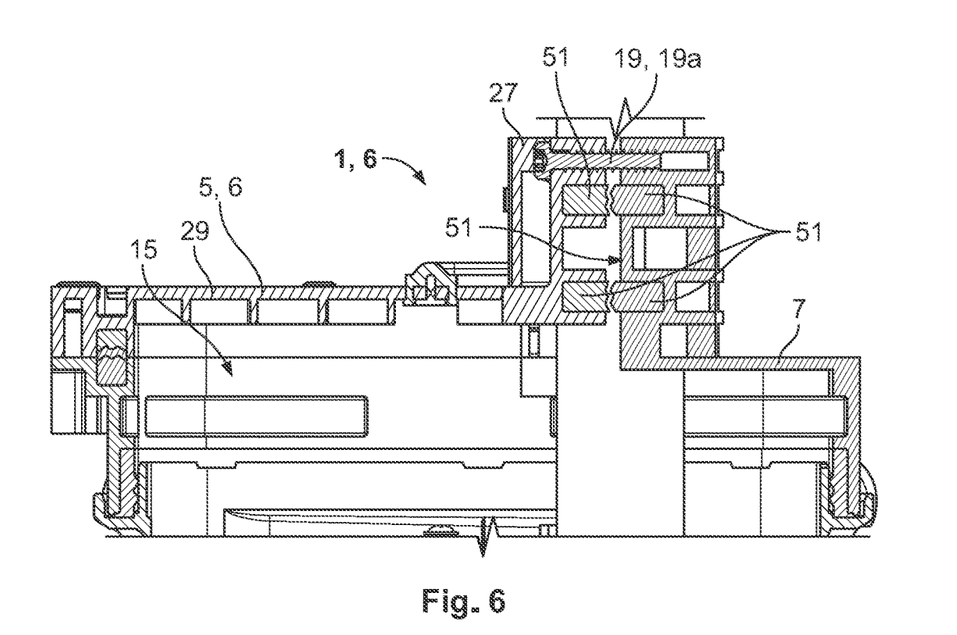
FIG. 6 is a sectional side view of the angled housing assembly of FIG. 5.
Figure 7:
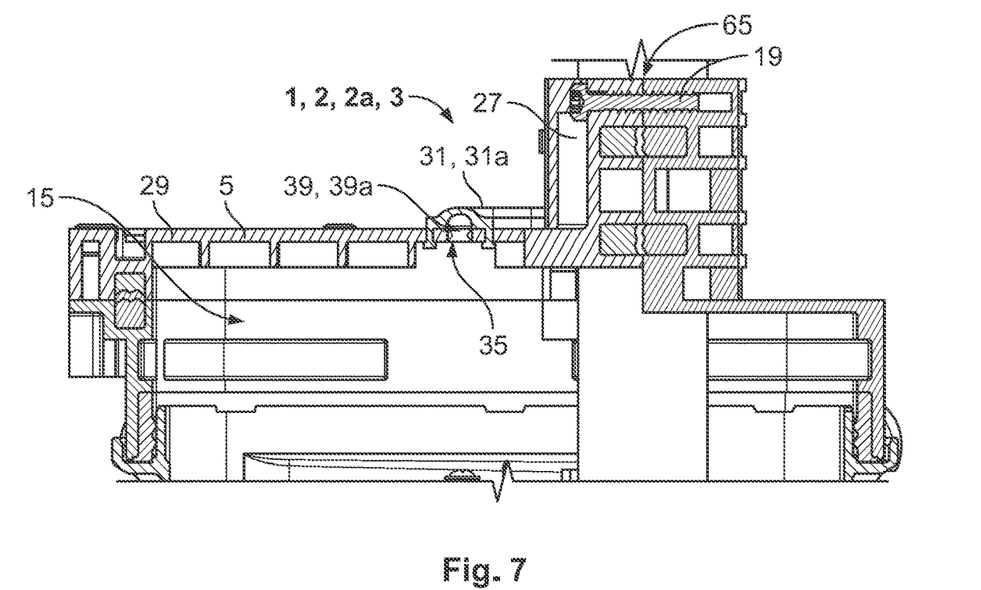
FIG. 7 is a sectional side view of the angled housing assembly in an assembly state.

FIGS. 5 to 7 concern the assembly process of the angled housing assembly 1. In FIG. 5, the angled housing assembly 1, the angled housing part 5, as well as the complementary angled housing part 7 are shown in the initial state 6.

The cables 13 are received in the corresponding cable channels 9 and the angled housing part 5 is moved along a second mounting direction 63 (also: installation direction) towards the complementary angled housing part 7. In doing so, the flange surface 49 of a first flange section 5c of the first section 27 is located at a distance 65 to the flange section 7b of a complementary first section 67 of the complementary angled housing part 7.

The distance 65 may allow mounting of the second section 29 to the complementary second section along the second mounting direction 63 without abutting the first section 27. This in particular prevents the flange surface 49 of the first section 27 being in mechanical contact with the complementary first section 67. Joining the second section 29 to the complementary second section, the first section 27 is moved parallel to the complementary first section 67 without mechanically touching it. The distance 65 between the first section 27 and the complementary first section 67 remains constant in an embodiment during joining the second section 29 with the complementary second section. Thus, by the distance 65, a sealing gasket 51 or a flange surface 49 of one of the first section 27 and the complementary first section 67 do not touch the corresponding other one of the complementary first section 67 and the first section 27. This reduces the risk of damage or unwanted displacement of any element of the angled housing assembly 1. This can also be seen in the cut side view shown in FIG. 6, which additionally shows a fixation device 19 in the form of a screw 19a provided in the first section 27.

The movement of the angled housing part 5 along the second mounting direction 63 is supported by the at least one guiding member 75, and in an embodiment two guiding members 75. If two guiding members 75 are provided, the two guiding members 75 may be arranged spaced apart essentially perpendicular to the second mounting direction 63, such that the movement of the angled housing part 5 along the second mounting direction 63 is smoothed by the two spaced apart guiding members 75. The at least one guiding member 75 guides the angled housing part 5 during assembly to the complementary angled housing part 7.

The installation or mounting direction 63 may be chosen in dependence on the first flange surface 49, which is at an angle to the second section 29. In an embodiment, the angle between the installation or mounting direction 63 and the second section 29 is smaller or equal to the angle between the flange surface 49 of the first section 27 and the second section 29. In particular, if the flange surface 49 of the first section 27 is oriented perpendicular to the second section 29, the installation or mounting direction 63 may be oriented perpendicular to the second section 29, i.e. essentially parallel to the flange surface 49 of the first section 27.

The first mounting direction 41 and the second mounting direction 63 may be oriented to each other under an angle between 30 degrees and 150 degrees, and in an embodiment between 45 degrees and 135 degrees. In another embodiment, the mounting directions 41, 63 are oriented perpendicular to each other.

In FIG. 6, the angled housing part 5 is still in the initial state 6. Positioning of the first section 27 of the angled housing part 5 with respect to the complementary first section 67 of the complementary angled housing part 7 may thus be easily performed by positioning the second section 29 of the angled housing part 5.

Subsequently, as shown in FIG. 7, the angled housing assembly 1 is brought into the assembly state 3 by actuating the fixation device 19. Thereby, the distance 65 is reduced to zero and the sealing gaskets 51 are pressed against one another. In addition, the predetermined breaking zones 39 of the material bridges 35 is broken or severed, i.e. is in a broken state 39a. The bellows section 31 allows for this relative movement of the first section 27 with respect to the second section 29 and is brought into a stretched state 31a.

The angled housing part 5 may comprise at least two states, the initial state 6, in which the first section 27 and the second section 29 are rigidly connected to one another, and the assembly state 3, in which the first section 27 and the second section 29 are separated from each other and arranged to be moved relative to one another. The angled housing part 5 may be brought from the initial state 6 into the assembly state 3 by breaking or severing the at least one material bridge 35, in particular the at least one predetermined breaking zone 39.

The angled housing assembly 1 may comprise an intermediate state, in which the second section 29 is joined to the corresponding complementary second section, and wherein the first section 27 is located at the distance 65 to the corresponding complementary first section 67. More generally, the section that comprises the angled flange surface 49 is joined to the corresponding complementary section of the complementary angled housing part 7.

In the assembly state 3, shown in FIG. 7, the first section 27 and the second section 29 of the angled housing part 5 are movable relative to another. The sections 27, 29 of the angled housing part 5 may be moved away from each other along, respectively against the first mounting direction 41. Accordingly the bellows section 31 may be expanded along, respectively against the first mounting direction 41 as well. The first mounting direction 41 may in particular be oriented perpendicular to the second mounting direction 63 or perpendicular to the first flange surface 49.

With reference to FIG. 1, it is noted that the bellows section 31 has a first end 73 and a second end 75. The bellows section 31 does not extend linearly from the first end 73 to the second end 75. A three-dimensional shape of the bellows section 31 comprising curves 77 and steps 79 minimizes rotational movements of the first section 27 with respect to the second section 29. Nevertheless, the interior 15 of the angled housing assembly 1 is sealed.

As the bellows section 31 does not extend linearly from the first end 73 to the second end 75 of the bellows section 31, no hinge line is formed between the first section 27 and the second section 29. Thus, a pivoting or rotating motion of the first section 27 relative to the second section 29 is prohibited. The bellows section 31 thus does not extend linearly but comprises a curved shape, i.e. a shape comprising at least one curvature. In the bellows section 31, which forms a curved connection section, at least three points may be defined at which the first section 27 is connected (by the corresponding portion of the bellows section 31) to the second section 29. Those three points are not located on a common line but span a plane, thereby minimizing any relative rotational movement between the first section 27 and the second section 29.

Differently shaped bellows sections 31 are conceivable. For the purposes of explanation, one may define the second section 29 of the angled housing part 5 as a flat structure having a longitudinal extension and a transversal extension perpendicular to the longitudinal extension. At a first end of the second section 29, the bellows section 31 extends along a direction parallel to the transversal direction. If viewed along a direction perpendicular to the longitudinal and to the transversal direction, the bellows section 31 may for instance comprise a convex or concave curvature, a V-shape or may comprise at least one step. The step may be understood as the bellows section 31 comprising at least one segment of the bellows section 31, which is displaced in the longitudinal direction relative to at least one adjacent second segment of the bellows section 31. Such an embodiment of the bellows structure may comprise two opposing steps, the shape of which may be described by a square function. Alternatively, the bellows section 31 may have a shape that may be described by a sinus function or a triangular function. The bellows section 31 thus may comprise bent portions, knee-shaped or step-shaped portions or portions that are angled with respect to one another.

Further, in addition or alternatively to such a shape of the bellows section 31, end portions of the bellows section 31 may be bent and extend in a direction perpendicular to the longitudinal and transversal extension of the second portion 29. If viewed along the longitudinal direction, the bellows section 31 may thus comprise a U-shape.

In any embodiment, a bellows section 31 that does not extend along a straight line may minimize a relative rotational movement between the first section 27 and the second section 29. Thus, also the angled housing part 5 in the assembly state 3, i.e. with a broken/severed material bridge 35, may still be assembled to a complementary angled housing part 7 for forming the electrical connector 2.

Figure 9:
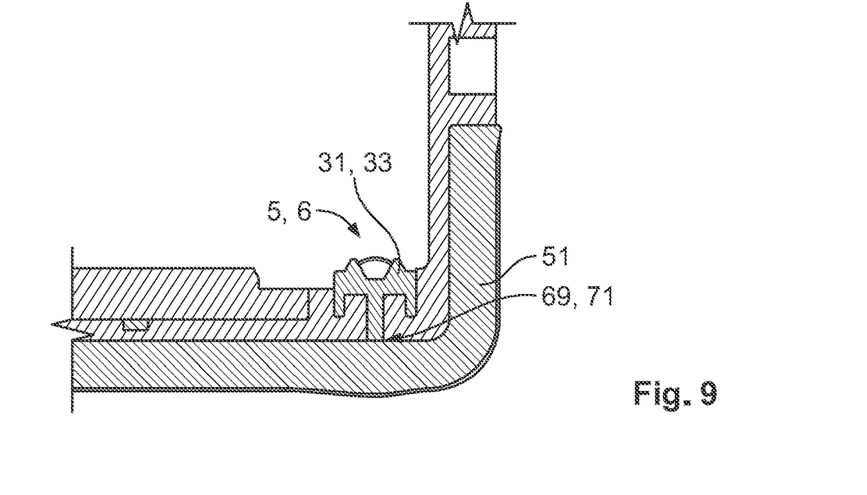
FIG. 9 is a detail sectional side view of the angled housing part in the initial state.

FIG. 9 shows a detailed cut view of a region where the bellows section 31 is chemically adhered to the sealing gasket 51. This figure shows the initial state 6 of the angled housing part 5. In a contact region 69, chemical adhesion 71 occurs between the bellows section 31, in particular between the elastic material 33 and the sealing gasket 51.

The present invention allows to maintain a single integrated housing part 5 that is simple to handle and, at the same time, allows for the application of an assembly process like for a multi-part housing which minimizes the risk of damage by handling the components individually. The inventive solution may be easier to apply in automated harnessing processes than prior art solutions.

The angled housing part 5 allows an easy and efficient assembly of the angled housing part 5 for forming the electric connector. The first section 27 and the second section 29 are connected to one another and may thus be installed simultaneously and not in different, separate assembly steps. This renders handling and assembly of an angled housing part 5 and the angled housing assembly 1 easier, particularly in view of a harnessing process.

What is claimed is:

1. An angled housing part for an electrical connector, comprising:
    a first section having a first flange surface;
    a second section having a second flange surface, the first flange surface is angled with respect to the second section; and
    a bellows section arranged between and connecting the first section and the second section, the first section and the second section are movable relative to one another upon elastic deformation of the bellows section.

2. The angled housing part of claim 1, wherein the first section and the second section are rigidly connected to one another in an initial state.

3. The angled housing part of claim 2, wherein the first section and the second section are rigidly connected to one another by a material bridge across the bellows section.

4. The angled housing part of claim 3, wherein the material bridge has a predetermined breaking zone extending along the bellows section.

5. The angled housing part of claim 3, wherein the bellows section includes an elastic material.

6. The angled housing part of claim 5, wherein a rigidity of the elastic material of the bellows section is lower than a rigidity of at least one of the first section, the second section, and the material bridge.

7. The angled housing part of claim 2, wherein the first section and the second section are separated by a gap in an assembly state.

8. The angled housing part of claim 7, wherein the gap is sealingly closed by the bellows section.

9. The angled housing part of claim 5, wherein the material bridge has a perforation filled by the elastic material of the bellows section.

10. The angled housing part of claim 1, wherein the first section, the second section, and the bellows section form an integral multi-component molded part.

11. The angled housing part of claim 1, wherein the bellows section forms a sealing gasket between the first section and the second section and extends to at least one of the first flange surface and the second flange surface.

12. The angled housing part of claim 1, wherein the bellows section extends non-linearly from a first end to a second end.

13. The angled housing part of claim 1, further comprising a guiding member guiding the angled housing part during assembly to a complementary angled housing part along a mounting direction that is essentially parallel to the first flange surface.

14. An angled housing assembly, comprising:
    an angled housing part including a first section having a first flange surface, a second section having a second flange surface, the first flange surface is angled with respect to the second section, and a bellows section arranged between and connecting the first section and the second section, the first section and the second section are movable relative to one another upon elastic deformation of the bellows section; and
    a complementary angled housing part adapted to be joined with the angled housing part.

15. The angled housing assembly of claim 14, wherein the first section of the angled housing part is joined to a corresponding complementary first section of the complementary angled housing part in a first mounting direction and the second section of the angled housing part is joined to a corresponding complementary second section of the complementary angled housing part in a second mounting direction angled with respect to the first mounting direction.

16. The angled housing assembly of claim 15, wherein, in an intermediate state of mounting the angled housing assembly, the second section is joined to the corresponding complementary second section and the first section is located at a distance to the corresponding complementary first section.

17. The angled housing assembly of claim 16, wherein the distance between the first section and the corresponding complementary first section is reduced to zero in an assembly state of the angled housing assembly.

18. The angled housing assembly of claim 17, wherein, in the assembly state, the first section and the second section are moved away from each other compared to an initial state.

19. The angled housing assembly of claim 18, wherein a sealing gasket of the angled housing part and/or the complementary angled housing part has a precompensation region with an excess sealing gasket material.

20. The angled housing assembly of claim 19, wherein the precompensation region compensates a lateral contraction of the sealing gasket in the assembly state due to a longitudinal extension of the sealing gasket during a transition from the intermediate state to the assembly state.

* * * * *